Patented Aug. 18, 1931

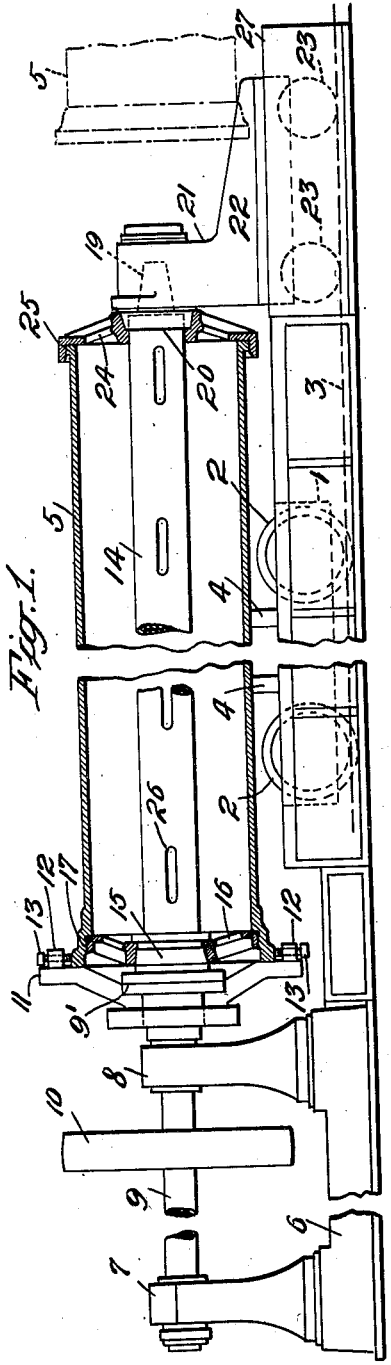
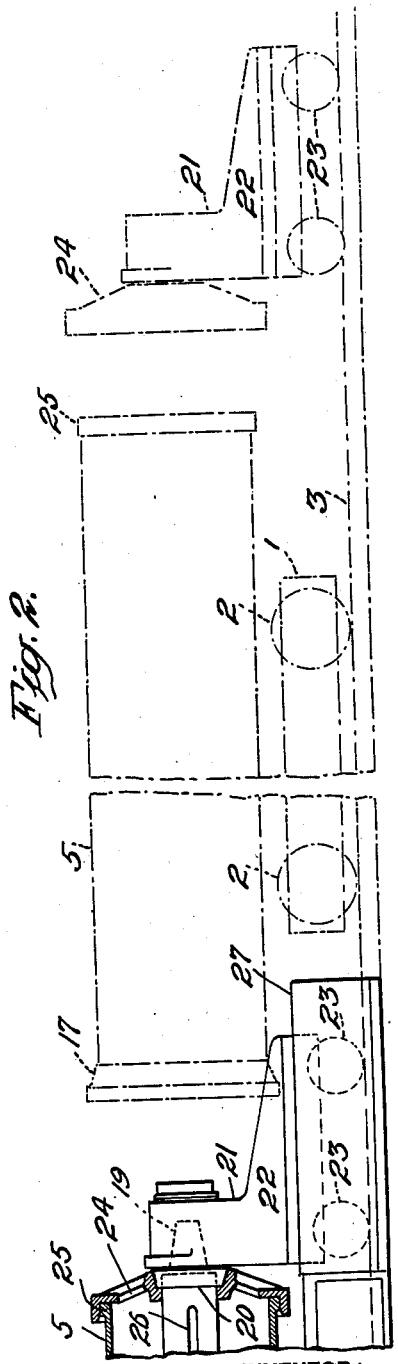

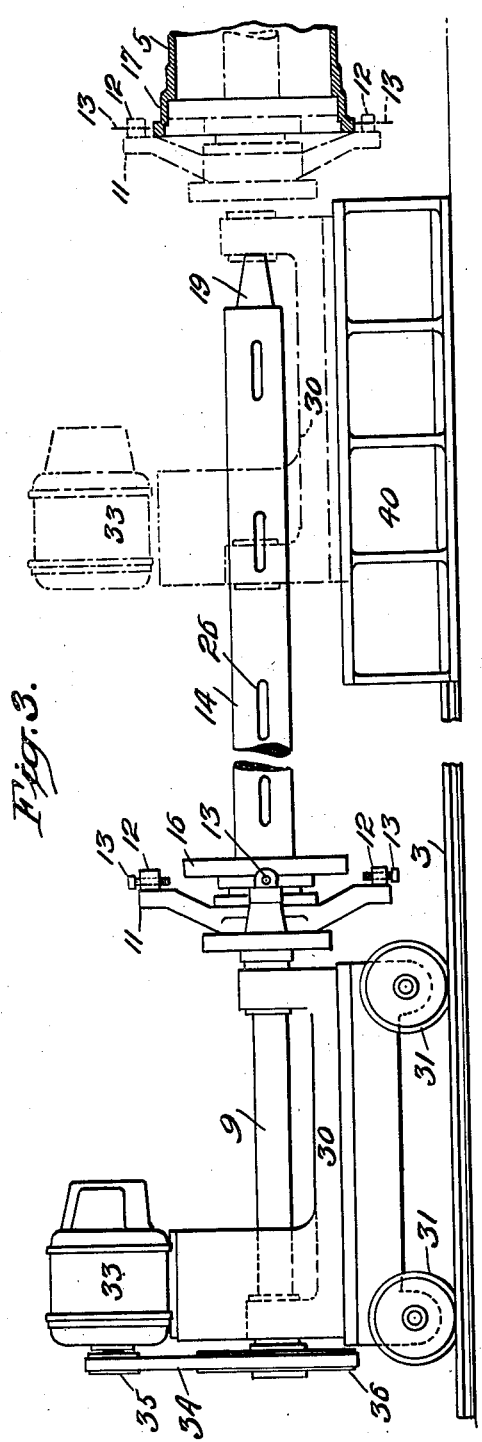
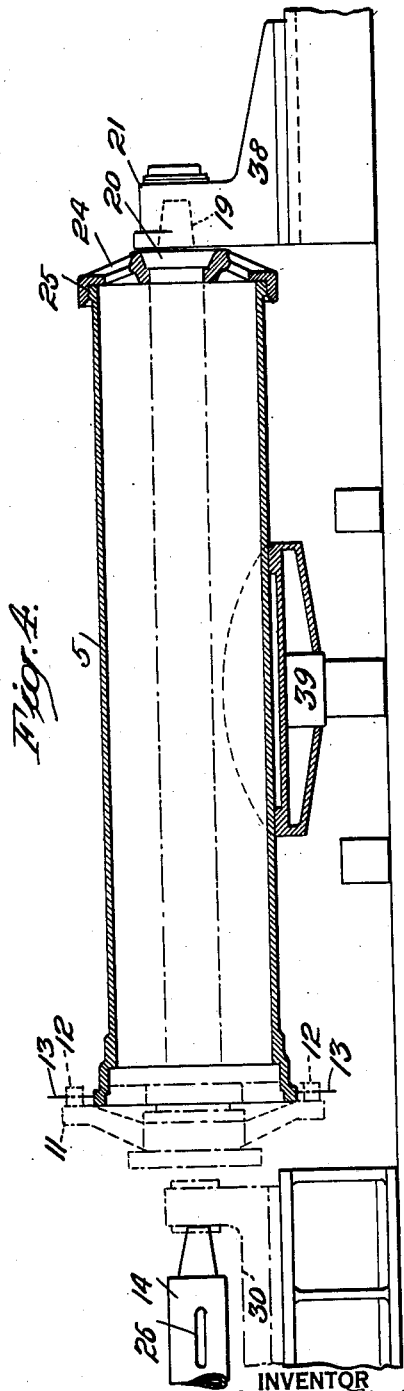

1,819,188

UNITED STATES PATENT OFFICE

ALEXANDER MELVILLE, KENNETH DUNDAS, AND RALPH ALEXANDER WHITSON, OF GLASGOW, SCOTLAND

MANUFACTURE, CENTRIFUGALLY, OF PIPES AND OTHER HOLLOW ARTICLES

Application filed November 21, 1927, Serial No. 234,694, and in Great Britain November 24, 1926.

This invention relates to the manufacture, centrifugally, of pipes, columns and other hollow articles from plastic or molten material of all descriptions and to the lining centrifugally of such articles with the same or other material.

As is well known, various proposals have been made for subjecting plastic material to centrifugal force for the purpose of producing articles made in moulds, with or without reinforcement, or of lining articles previously made in any suitable way. The apparatus proposed has commonly included means whereby the mould or article may be rotated on a horizontal axis at the required speed and in certain cases the device for feeding the material to the mould consists of an overhung tube mounted on a carriage and adapted to penetrate the mould or hollow article co-axially through the rotatable mould carrier.

The object of this invention is to provide an apparatus which eliminates the drawbacks inherent in prior proposals and combines the advantages of efficiency and economy, eliminating also heavy stresses set up on rotation at high speed of engaging bodies of larger diameter than the mould or article.

It may be mentioned here that the hollow articles to be moulded or lined, such as pipes, may be long or short and have varying diameters.

According to this invention apparatus for use in the manufacture, centrifugally, of pipes, columns and other hollow articles from plastic material comprises a tube, trough, cylinder, beam, or the like constituting an overhung rotor, hereinafter referred to as the tube, carried by and projecting co-axially from the end of a driving shaft mounted in bearings on a headstock which may be either stationary or movable. The driving shaft and the adjacent end of the overhung tube are provided with devices, which may include end discs, diaphragm spiders or the like, rotatable with said shaft and tube and engageable internally or externally or both internally and externally with the end of the mould or hollow article, associated with means for effecting a tight connection and ensuring that the tube and the mould or article shall rotate together. A tailstock is located at a suitable distance from and in alignment with the headstock. When the headstock is stationary the tailstock is movable; when the headstock is movable the tailstock is stationary. The end of the overhung tube remote from the headstock is closed by a plug and is adapted to engage frictionally within a sleeve mounted for rotation in suitable bearings carried by the said tailstock. This sleeve carries a spider member adapted to fit externally and/or internally the end of the mould or hollow article.

Preliminarily to the moulding or lining operation, the mould or the article to be lined may be first brought by hydraulic or other suitable means to a station, which may be called the starting station, where it is received by the apparatus of the invention.

In the case where the headstock is movable and the tailstock is stationary the said headstock is moved away from the tailstock. The mould or other hollow article is brought to the tailstock and located in such a position that the clamping device, that is, the spider carried by the rotatable sleeve, engages the one end thereof. The headstock is brought forward so that the overhung tube penetrates the mould centrally till the end of said tube engages frictionally the rotatable sleeve. The other end of the mould is now in position to be clamped externally and internally to the spider devices at that end. The mould is now secured at both ends.

In the case of the headstock being stationary and the tailstock being movable the mould is passed over the overhung tube instead of the tube being passed through the mould with the same result, that is, the tube penetrates the mould till the same position is reached and the mould is secured at both ends as before.

When the overhung element consists of a tube it may serve as a distributor of plastic material which may be fed through one end or both ends thereof in which case its circumference is suitably apertured; or, provision may be made for introducing plastic material endwise into the annular space between the overhung element and the mould or hollow article.

In practice, the mould or hollow article is clamped or locked to the overhung element in its position of adjustment and thereupon the said element and the mould or hollow article are set in joint rotation, whereby the plastic material, (for example, cement, mortar, concrete, clay, bitumen or molten metal) is distributed over the internal lateral wall of the mould or hollow article.

The moulding or lining operation being completed, the clamping or locking means is loosened, and the headstock or tailstock as the case may be retracted from the mould or hollow article which may now be removed.

The tube may be contrived to serve not only as a means for carrying and rotating the mould or article but to serve also as a conduit or as a carrier for a conduit for medium (water, electric current, gas or air) for drying or cooling or heating the lining material and/or the internal surface of the mould or of the article.

In the accompanying drawings Figs. 1 and 2 each comprise a part elevation part vertical section of one form of apparatus according to the invention devised for the lining of pipes; Figs. 3 and 4 are like views to Figs. 1 and 2 showing an alternative construction.

Referring to Figs. 1 and 2, 1 denotes a travelling carriage mounted on wheels 2 running on rails 3 and carrying transverse members 4 adapted to support the pipe 5 to be lined. 6 denotes a stationary headstock sustaining bearing members 7 and 8 in which is rotatably mounted a horizontal hollow spindle 9 to which are keyed a driving pulley 10 and a spider member 11 having eyed lugs 12 in which are threaded pins 13 adapted to clamp the pipe 5 to the member 11.

Flanged to the spindle 9 at 9' and coaxial with the spindle is an overhung horizontal tube 14 upon which is mounted at 15 adjacent to the headstock 6 a spider member 16 adapted closely to fit within the flanged end 17 of the pipe 5.

The end of the tube 14 remote from the headstock 6 is closed by a plug 19, adapted to engage frictionally within a sleeve 20 mounted for rotation in a bearing member 21 carried on a tailstock 22 mounted on wheels 23 running on the rails 3. Fixed on the sleeve 20 and rotatable therewith is a spider member 24 which is adapted to fit externally the end 25 of the pipe 5. Then the pins 13 are adjusted to grip the pipe which can now be set in rotation by rotation of the spindle 9.

Lining material is fed through the hollow spindle 9 and through the tube 14 whence it is projected on to the interior of the rotating pipe 5 by way of apertures as 26 in the lateral wall of the tube 14.

In the modification illustrated in Figs. 3 and 4 the headstock 30 is mounted on wheels 31 running on the rails 3 and carries the spindle 9 and the tube 14 as also an electric motor 33 which is operatively connected to the spindle 9 by a driving chain 34 running over sprocket wheels 35 and 36 on the motor armature spindle and on the spindle 9 respectively.

The tailstock 38 is stationary and carries the sleeve 20 and spider 24.

In operation, the pipe 5 is positioned relatively to the tailstock as shown in Fig. 4, being supported by a carrier 39 about midway of its length. The headstock 30 is then run forward to the position shown in chain-dotted lines in Fig. 3 until the plug 19 at the end of the tube 14 engages the sleeve 20 in the tailstock and the pipe 5 is engaged by the spider member 16.

The headstock 30 is then locked stationary between side members 40, and the clamping screws 13 are adjusted to engage the pipe. The carrier 39 is then lowered clear of the pipe and the motor circuit closed to initiate rotation of the pipe.

What we claim is:

1. Apparatus for moulding, centrifugally, pipes, columns and other hollow articles from plastic or molten material or for lining such articles with the same or other material, comprising a headstock, a rotary driver including an overhung element sustained by said headstock for rotation about a horizontal axis, means on said element engageable internally with one end of a hollow mould, means fitted to said driver engageable externally with the same end of said mould, a tailstock, a rotatable member sustained by said tailstock to engage the other end of said overhung element and means on said rotatable member for engaging the other end of said mould.

2. Apparatus for moulding, centrifugally, pipes, columns and other hollow articles from plastic or molten material or for lining such articles with the same or other material, comprising a headstock, a rotary driver including a spider member and an overhung element of less diameter than said spider, both sustained by said headstock for rotation about a horizontal axis, releasable clamping means on said spider and overhung element arranged to have releasable engagement externally and internally with one end of a hollow mold, a tailstock, a rotatable member sustained by said tailstock to engage the other end of said overhung element, and means on said rotatable member for engaging the other end of said mold.

In testimony whereof we have signed our names to this specification.

ALEXANDER MELVILLE.
KENNETH DUNDAS.
RALPH ALEXANDER WHITSON.